United States Patent Office 3,490,313
Patented Jan. 20, 1970

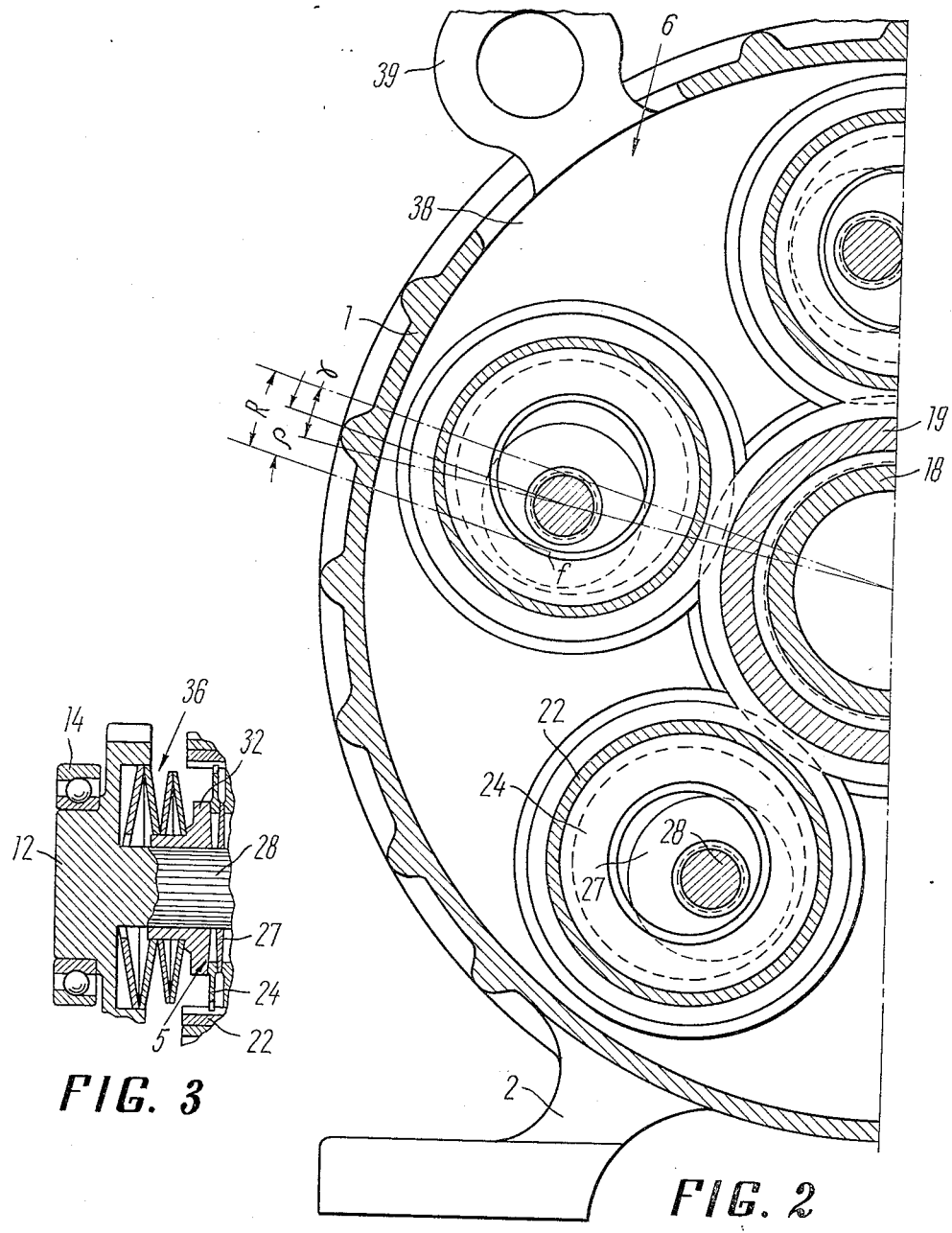

3,490,313
MULTIDISC TWO-ROW PLANETARY FRICTION PROGRESSIVE TRANSMISSION
Nikolai Alexandrovich Astrov, Ulitsa Chaplygina 1/12, kv. 8, Moscow, U.S.S.R.; Vyacheslav Vasilievich Egorkin, Moskovskaya oblast, ulitsa Bugovskogo 10, kv. 3, Mytischi, U.S.S.R.; and Albert Nikolaevich Klemin, Devyatkin pereulok 4, kv. 16; Vladimir Ivanovich Leonov, Begovaya ulitsa 24, kv. 10; Vladimir Alexeevich Petrushev, Sivtsev-Vrazhek pereulok 15/25, kv. 9; Nikolai Georgievich Speransky, 1 Krasnoarmeiskaya ulitsa 11, kv. 33; and Igor Alexandrovich Strigin, Smolensky bulvar 17, kv. 9, all of Moscow, U.S.S.R.
Filed Aug. 23, 1967, Ser. No. 662,655
Int. Cl. F16h 15/50
U.S. Cl. 74—796    4 Claims

ABSTRACT OF THE DISCLOSURE

The present invention relates to multidisc friction progressive transmissions used in power drives of general engineering and in power transmissions of road transport facilities.

A multidisc two-row planetary friction progressive transmission is provided wherein the torque is transmitted from a driving shaft through a first row of a planentary mechanism to multidisc friction devices and to a second row of planetary mechanism and then is taken off from an output or driven shaft.

The first row of the planetary mechanism has a central (sun) gear mounted on the driving shaft thereof; the central gear meshes with planet wheels mounted on shafts which by means of splines and pressure devices are connected with friction discs that interact with larger diameter friction discs; the larger diameter friction discs transmit the torque to the planet wheels of the second row of the planetary mechanism in such a manner that said planet wheels of the second row of the planetary mechanism are interconnected through the intermediary of a cage of a mechanism adapted to control the gear ratio, which cage together with the bearings of said planet wheels is arranged between the bearings which support the shafts with the planet wheels of the first row of the planetary mechanism, the planet wheels of the second row of the planetary mechanism interacting with the sun gear mounted on the output shaft.

---

This invention relates to multidisc two-row friction progressive transmissions used in power drives of general engineering and in power transmissions of road transport facilities.

In the friction multidisc two-row planetary progressive transmissions known heretofore, the input torque is transmitted from the drive shaft via a first row planetary mechanism to a second row planetary mechanism and is taken off from the driven shaft (U.S. Patent No. 3,158,036).

In the progressive transmission mentioned above, the first row planetary mechanism is made usually in the form of central (sun) taper friction discs mounted on the drive shaft and externally engaged with taper discs of a smaller diameter mounted on the planet wheel shafts from which the torque is transmitted to the taper friction discs of the second row planetary mechanism. These discs interact on the internal contact principle with the large-diameter taper discs of the second row planetary mechanism, the axis of the latter discs coinciding with the central axis of the entire planetary mechanism. Said discs of the larger diameter are connected to the driven output shaft.

The term "internal contact" is used to denote a characteristic feature of the friction transmission consisting in that the points of contact of the discs are located on one side of the parallel geometric axes of the driving and driven discs as distinct from the friction transmissions with an "external contact" where the contact points of the taper discs are arranged between the geometric parallel axes of the driving and driven discs.

Disadvantages of the above-mentioned progressive transmissions consist in that the presence of multidisc friction external contact sets of the first row planetary mechanism as well as a considerable difference in the diameters of the driving and driven friction discs results in a reduction of the geometric efficiency of the mechanism.

A considerable difference between the diameters of the driving and driven sets of internal-contact friction discs of the second row planetary mechanism exerts an adverse effect upon the relative geometric sliding of the contacting discs and, consequently, also reduces the geometric efficiency. One of the essential disadvantages of the above-mentioned progressive transmissions is the impossibility of using each of the multidisc sets of friction discs as a coupling in which the driving and driven discs rotate as an integral unit.

Another disadvantage of the above-mentioned progressive transmission is the necessity of providing it with a complicated gear-lever mechanism for changing the ratio of the progressive transmission. A large number of mechanically connected pairs in these gear-lever mechanisms leads to excessive summary clearances which, in turn, prevents simultaneous and uniform changes of the ratio in all the friction sets of the planetary mechanism. The latter disadvantage results in additional losses of power in the progressive transmission.

Besides, a disadvantage of these progressive transmissions consists in the impossibility of selecting a wide range of control because of a limited number of combinations of diameter sizes of the friction discs in the first row and second row planetary mechanisms.

An object of this invention is to provide a multidisc two-row planetary friction progressive transmission which would ensure a higher efficiency and a wider range of ratio control as well as, in a particular embodiment, a coaxial position of the driving and driven friction discs operating as a coupling with a high efficiency.

Another object of the invention is to provide a simple and reliable device for changing the ratio of the progressive transmission.

In accordance with these and other objects, the invention provides a design of the progressive transmission comprising a first row planetary mechanism and a second row planetary mechanism in combination with a set of friction discs with the internal contact only, the driven and driving discs in a particular embodiment being arranged coaxially and functioning as a coupling to ensure a high efficiency.

According to the invention, the first row planetary mechanism incorporates a central (sun) gear mounted on a driving shaft and meshing with planet wheels mounted on their respective shafts. The planet wheels are connected by pressure devices and splines with the friction discs which interact with larger-diameter friction discs of the friction set included into the second row planetary mechanism. The planet wheels of the second row planetary mechanism spline-connected with the larger-diameter friction discs, are coupled with the ratio control device and interact with the central (sun) gear mounted on the driven shaft of the mechanism.

It is practicable to design the transmission ratio control device in the form of a rotatable cage with a lever, said cage being installed coaxially with the housing and mounted in it so that when the cage is turned with respect to the housing, around their common axis, the friction discs of the second row planetary mechanism are shifted for changing the ratio of the progressive transmission.

The connection of the larger-diameter friction discs with the planet wheels of the second row planetary mechanism should better be effected by means of external splines on said discs entering the internal splines of the planet wheels. The small diameter friction discs of the second row planetary mechanism may be installed on the same shaft with the planet wheels of the first row planetary mechanism.

Other objects and advantages of the present invention will become apparent from the description which follows and the appended drawings in which:

FIG. 2 is a sectional view taken along line I—I of FIG. 1;

FIG. 3 shows a section of an embodiment with an axial pressure mechanism; and

In describing the pressure embodiment of the invention, the terms in their narrow sense are used for the sake of clarity. However, the invention is not confined to the narrow sense of the terms so adopted and it will be understood that each of said terms embraces all the equivalent elements functioning similarly and employed for the same purposes.

Figure 1:
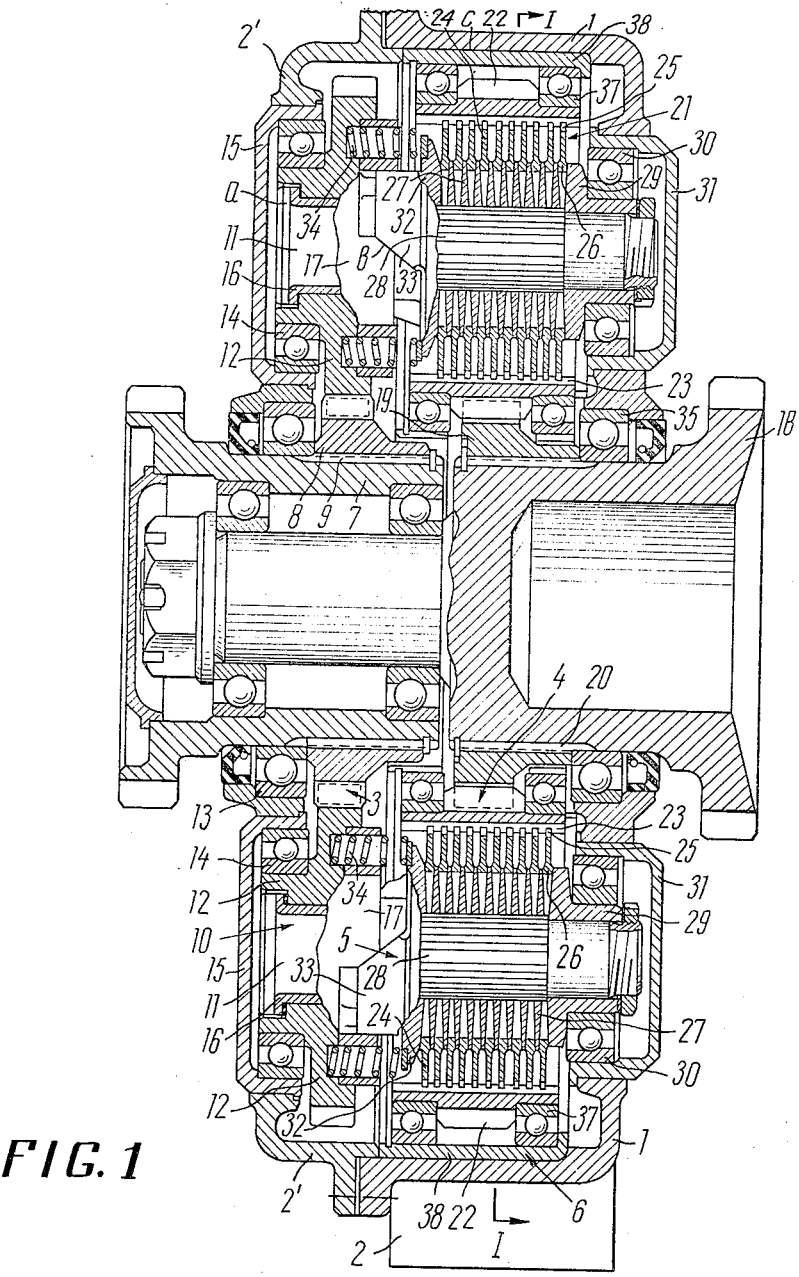
FIG. 1 illustrates, according to the invention, a section of a multidisc two-row planetary friction progressive transmission.

According to the invention, the multidisc two-row planetary friction progressive transmission comprises a housing 1 (FIG. 1) with brackets 2 for installation and fastening, a cover 2', a first row planetary mechanism 3, a second row planetary mechanism 4, an axial pressure mechanism 5 and a device 6 (FIG. 2) for controlling the transmission ratio.

The first row planetary mechanism 3 (FIG. 1) comprises a central driving shaft 7, a central sun gear 8 mounted on said shaft by means of a splined coupling 9, and planet wheels 10 consisting of a shaft 11 and gear wheels 12 mounted on said shafts.

The central driving shaft 7 is mounted in bearings 13 located in recesses of the cover 2' of the housing 1. Gear wheels 12 of the planet wheels 10 rotate in bearings 14 accommodated in sleeves 15 installed in the recesses of the cover 2'.

The gear wheels 12 are loosely mounted on bushings 16 of the shafts 11 of the planet wheels 10. The gear wheels 12 have screw cams 17 of the axial pressure mechanism 5.

The second row planetary mechanism 4 comprises a central driven shaft 18, a central sun gear 19 mounted on said shaft by means of a splined coupling 20, planet wheels 21 consisting, each of a hollow gear wheel 22 with splines 23 on the internal surface; larger friction discs 24 whose external surface is provided with splines 25 engaging the internal splines 23 of the hollow gear wheel 22, the working surface 26 of the splines being of a conical or toroidal shape; smaller friction discs 27 of a tapered shape, installed by means of splines 28 on the shafts 11 of the planet wheels 10 of the first row planetary mechanism and second row planetary mechanisms 3 and 4 can be 3. The shafts 11 of the planet wheels 10 and 21 of the first made from two pieces.

The friction discs 24 and 27 form a single working set. The entire set of the friction discs 12 located between a tapered thrust flange 29 placed on one end of the shaft 11 and a pressure flange 32 located on the other end of the same shaft.

The pressure flange 32 is provided with screw cams 33 of the axial pressure mechanism 5 interacting with the cams 17 of the same mechanism. The flange 29 is installed in bearings 30 accommodated in sleeves 31, the latter being mounted in the recesses of the housing 1.

The axial pressure mechanism 5 comprises also springs 34 used for preliminary compression of the friction disc set. The central driven shaft 18 of the second row planetary mechanism is installed in bearings 35 located in a recess of the housing 1.

The axial pressure mechanism 5 may be of another design as shown in FIG. 3. The axial pressure mechanism 5 consists of a set of disc springs 36 and the pressure flanges 32 of a modified type.

In addition to the above indicated designs of the axial pressure mechanism 5, it is possible to use another known mechanism which would ensure axial closing of the set of friction discs.

The hollow gear wheels 22 are installed in bearings 37 located in the recesses of a rotatable cage 38 of the device 6 (FIG. 2) for changing the ratio of the progressive transmission, said cage being in turn accommodated in recess C (FIG. 1) of the housing 1, the geometrical axis of the recess coinciding with the axes of the shafts 7 and 18.

The device 6 for changing the ratio of the progressive transmission consists of a rotatable cage 38 and lever 39 (FIG. 2) (or a primary sector, a toothed quadrant or any other component). Connected to the lever 39 in a mechanism of any design (not shown in the drawing) which ensures changing of angle $\gamma$ characterizing the relative positions of the housing 1 and the rotatable cage 38.

Figure 4:
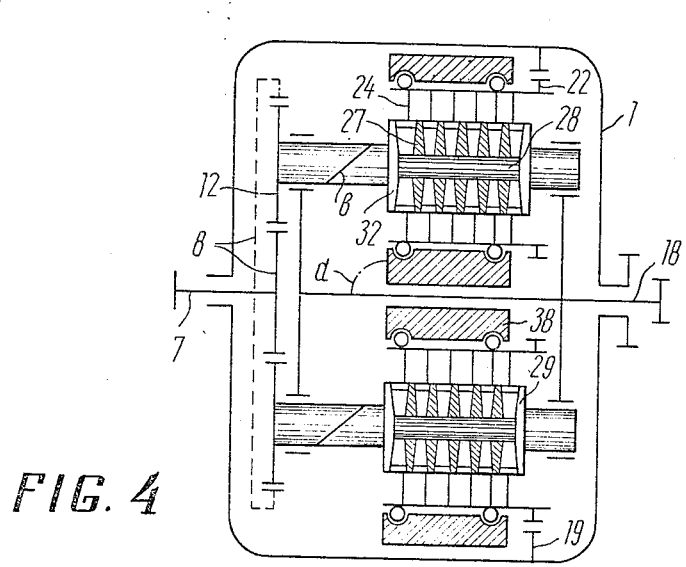
FIGS. 4 and 5 illustrate gearing diagrams of the progressive transmissions with various types of internal and external contact of the central (sun) gears with the planet wheels of both first and second row planetary mechanisms.
Figure 5:
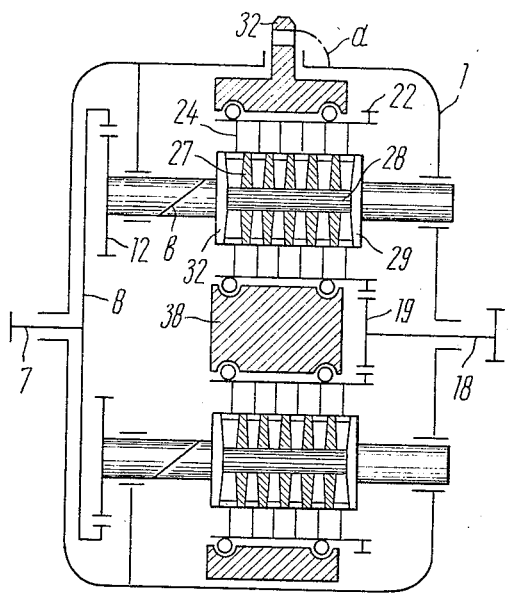

The multidisc two-row planetary friction progessive transmission may be embodied in other designs as shown in FIGS. 4 and 5.

The progressive transmission shown in the gearing diagram, FIG. 4, differs from the above described embodiment in that the central gear 19 of the driven shaft of the second row planetary mechanism 4 is connected to the gear wheels 22 of the planet wheels 21 by internal engagement when the first row planetary mechanism 3 is made with the central gear 8 having both the external and internal engagement (shown by dotted lines).

The progressive transmission shown in the gearing diagram, FIG. 5, the central gear 8 of the first row planetary mechanism 3 has an internal engagement with the gear wheels 12 of the planet wheels 10 when the second row planetary mechanism 4 is designed as described in the main example of embodiment.

The multidisc two-row planetary friction progressive transmission operates as follows. The transmission housing 1 is installed on a support by means of the brackets 2.

The torque of the rotating shaft 7 is transmitted from the central (sun) gear 8 to the gear wheels 12 of the planet wheels 10 of the first row planetary mechanism 3. From the gear wheels 12 the torque is transmitted to the set of discs of the second row planetary mechanism 4 by means of the axial pressure mechanism 5 and, in particular, by helical surfaces B building up an axial pressure force proportional to the input torque. From the friction discs 27, the torque moment is transmitted by friction forces arising as a result of their contact with the working surfaces 26 of the friction discs 24 by means of the splined coupling 25 to the hollow gear wheels 22 interacting with the central driven gear 19 mounted on the driven shaft 18 from which the torque is taken off.

At a relative position of the housing 1 and the rotatable cage 38 ensuring the concentric position of the shafts 11 and hollow planet wheels 22, the multidisc friction sets function as friction couplings so that the angular speeds of the discs 24 and 27 are the same and the discs themselves are in contact along the circular portions of the working surface 26 of the discs 24. The transmission ratio of the progressive transmission in this case is determined by the ratio of the couples 8, 12 and 22, 19.

The ratio of the progressive transmission can be changed by turning the cage 38 with respect to the housing 1, about their common axis.

As the control mechanism sets upon the lever 39 of the cage 38 and turns it through the angle γ (FIG. 2) the relative position of the discs 24 and 27 in all the friction sets changes simultaneously by the same value so that the zone of the disc contact is located around the points f whose distances to the geometric axes of the shafts 11 and hollow gear wheels 22 become correspondingly equal to the friction radii ρ of the discs 24 and R of the discs 27. Besides the gear pairs of both planetary mechanisms, the ratio of the progressive transmission in this case is determined by the relation of the radii ρ and R. The adjustment range of the progressive transmission is determined in this case by the range of the variable radius ρ of the discs 24. The change of the summary axial width of the multidisc set is compensated by the axial travel of the pressure flange 32.

The progressive transmission illustrated on the gearing diagrams (FIGS. 4 and 5) can work also as a three-link differential mechanism or as a planetary transmission with one degree of freedom. In these cases the housing 1 is made rotatable (brackets 2 are not provided) and is equipped with a component (not shown in FIGS. 4 and 5) for taking the torque for example a toothed rim or a pulley. To prevent self-braking, the radii of the central gears 8 and 19 are made different.

The operation of the progressive transmission as a three-link differential mechanism differs from the operation of the basic example described above in that the torque is transmitted to the three main coaxial elements, that is the shafts 7, 18 and also to the rotatable housing 1.

The operation of the progressive transmission as a planetary drive differs from the operation of the basic example described above and from the operation as a three-link differential mechanism in that, after a complete braking of one of the central shafts 7 or 18 the torque moment is transmitted to the other central shaft and rotatable housing 1.

The advantages of the multidisc two-row planetary friction progressive transmission include the following.

The planetary mechanism of both the first and second rows is made from gear wheels. Such a design of the progressive transmission makes it possible to step up its efficiency and change the ratio of the entire mechanism within wide limits.

The gears in both planetary rows of the progressive transmission may be made with either external or internal engagement, in any combination. This feature also allows wide variations of the critical values of the ratio.

The use in the progressive transmission of a friction set with the internal contact only increases the efficiency up to 80–97% at different duties as compared to 70–80% for the transmission with external contact.

The described progressive transmission has equal distances from its axis to the axes of the friction discs of both the large and small diameters. This design ensures simultaneous concentricity of all the discs in each set, so that each disc functions as a coupling thus additionally increasing the progressive transmission efficiency.

Both the large and small discs of the disc sets have a comparatively small difference of diameters. This exerts a favourable influence upon the relative geometric sliding of the contacting discs and, consequently, stops up the geometric efficiency.

The ratio control mechanism is made in the form of a rotatable cage carrying hollow toothed planet wheels connected to the friction discs. Such a design simplifies the control of the ratio and dispenses with the complicated gear-lever mechanism with all its inherent disadvantages.

Besides, advantageous features of the progressive transmission include simplicity of manufacture, processability, lower accuracy requirements of a number of units (in the first place the ratio control mechanism), and small size.

While a specific embodiment of the invention has been disclosed in the description, it will be understood that various modifications and changes falling within the spirit and the scope of the invention may occur to those skilled in the art.

These changes and modifications can be rsesorted to without departing from the true idea or scope of the invention as hereinafter defined by the appended claims.

What is claimed is:

1. A multidisc two-row planetary friction progressive transmission comprising a housing including bearings in opposite end faces thereof; a cage movably arranged in said housing and including bearings mounted therein; a driving shaft installed in said housing; an output shaft; a planetary mechanism including first and second rows, the first row of the planetary mechanism being driven by said driving shaft and including planet wheels and a sun gear mounted on said driving shaft, said sun gear being in mesh with said planet wheels; the second row of the planetary mechanism being rotated by the first row of the planetary mechanism and including planet wheels mounted on the bearings in said cage and a sun gear mounted on said output shaft and meshing with said planet wheels of the second row of the planetary mechanism; shafts turnably fixed together with said planet wheels of the first row of the planetary mechanism on the bearings in the opposite end faces of the housing; first friction discs mounted on the latter said shafts; second friction discs mounted for axial displacement inside said planet wheels of the second row of the planetary mechanism; the first friction discs having a smaller diameter than the second friction discs and adapted for engaging the latter to transmit rotation from the first row of the planetary mechanism to the second row thereof; a pressure means to provide mutual axial compression of the larger diameter friction discs and the smaller diameter friction discs; and means in said housing connected to said cage to vary the gear ratio of the planet wheels of at least one of said rows.

2. A multidisc two-row planetary friction progressive transmission as claimed in claim 1, wherein the pressure means includes a screw cam disposed on each said planet wheel of the first row of the planetary mechanism and a screw cam interacting therewith and disposed on a pressure flange mounted on said shaft of said planet wheel of the first row of the planetary mechanism and interacting with the end face of the extreme friction disc.

3. A multidisc two-row planetary friction progressive transmission as claimed in claim 2, wherein each said planet wheel of the first row of the planetary mechanism is integral with said shaft, springs being mounted on the latter said shaft to interact with said planet wheels of the first row of the planetary mechanism and said pressure flange.

4. A multidisc two-row planetary friction progressive transmission as claimed in claim 1, wherein said cage together with said planet wheels of the second row of the planetary mechanism and said larger diameter friction discs are arranged in said housing between said bearings of the shaft and of the planet wheel of the first row of the planetary mechanism.

References Cited

UNITED STATES PATENTS

| | | | |
|---|---|---|---|
| 2,583,496 | 1/1952 | Rougelot | 74—199 |
| 2,815,670 | 12/1957 | Jorgensen | 74—199 |
| 3,181,381 | 5/1965 | Jorgensen | 74—199 |
| 3,387,507 | 6/1968 | De Castelet | 74—796 |

ARTHUR T. McKEON, Primary Examiner

U.S. Cl. X.R.

74—199